United States Patent [19]

Ikari et al.

[11] 4,019,982

[45] Apr. 26, 1977

[54] METHOD FOR TREATMENT OF WASTE WATER CONTAINING ORGANIC POLLUTANTS

[75] Inventors: Yoshikatsu Ikari, Narashino; Shoichiro Yokoyama, Tokyo; Hideharu Yokoi; Tatsuo Murakami, both of Kamiichi, all of Japan

[73] Assignees: Agency of Industrial Science & Technology, Chiyoda; Fuji Chemical Industry Co., Ltd., Toyama, both of Japan

[22] Filed: May 29, 1975

[21] Appl. No.: 581,941

[30] Foreign Application Priority Data

May 31, 1974 Japan .............. 49-61633

[52] U.S. Cl. .............. 210/30 R; 210/40; 210/47
[51] Int. Cl.² .............. C02C 5/02
[58] Field of Search .............. 210/47, 45, 28, 30 R, 210/39–41, 32

[56] References Cited

UNITED STATES PATENTS

| 3,440,166 | 4/1969 | Davis et al. | 210/45 |
| 3,909,406 | 9/1975 | Lang | 210/47 |

*Primary Examiner*—Thomas G. Wyse
*Attorney, Agent, or Firm*—Oblon, Fisher, Spivak, McClelland & Maier

[57] ABSTRACT

An aqueous solution containing aluminum is mixed with an aqueous solution containing calcium and/or an aqueous solution containing magnesium and, if necessary, further with an aqueous solution containing iron and the pH of the resulting mixture is adjusted to cause insolubilization of the metallic elements present therein and consequently gives rise to a coprecipitation product. This coprecipitation product is dehydrated and dried and, as an adsorbent, brought into contact with waste water containing organic pollutants. The adsorbent adsorbs and removes said organic pollutants from said waste water.

6 Claims, No Drawings

METHOD FOR TREATMENT OF WASTE WATER CONTAINING ORGANIC POLLUTANTS

BACKGROUND OF THE INVENTION

The present invention relates to a method for the treatment of waste water containing organic pollutants. More particularly, this invention relates to a method for efficient removal of organic pollutants from various colored waster waters such as pulping waste water, water containing natural humic substances and dyeing waste water.

The colored waste waters as mentioned above contain organic pollutants which are possible sources for environmental pollution. Prior to release of these waste waters into rivers and other natural bodies of water, therefore, the organic pollutants must be thoroughly removed therefrom. The pulping waste water, for example, contains lignosulfonates and hemicelluloses in high percentages and, owing to their presence, is seriously impaired in color and shows notably high values of COD and BOD. For tolerable release of this waste water into a river, it is required to be deprived of lignosulfonates and hemicelluloses.

Various methods have heretofore been proposed for the detoxifying treatment of such a waste water. Of the various methods, comparatively effective are the massive lime method which uses calcium oxide as the adsorbent and the coagulation-sedimentation method which uses inorganic coagulants such as aluminum salts, iron salts and magnesium salts. Particularly, the massive lime method (for example, U.S. Pat. No. 3,639,206) has been recognized an advantageous treatment for a specific type of pulping waste water. In its present state, however, this method does not provide satisfactory effects on all sorts of waste waters containing organic pollutants and it has room yet to be improved in terms of capacity for removal of pollutants, capacity for sedimentation of formed flocks, capacity for dehydration of formed slurry, capacity for treatment of formed sludge, etc.

An object of the present invention is to provide a method for efficient, substantially complete removal of coloring organic pollutants which are contained in waste waters which are rich in organic pollutants of any type such as pulping waste water, water containing natural humic substances, dyeing waste water, etc.

SUMMARY OF THE INVENTION

To accomplish the object described above, the present invention provides a method for the treatment of waste water containing organic pollutants, which method comprises mixing an aqueous solution containing aluminum with at least one member selected from the group consisting of an aqueous solution containing calcium and an aqueous solution containing magnesium and, if necessary, further with an aqueous solution containing iron, adjusting the pH of the resulting mixture to cause the formation of the hydroxides of said metallic components thereby causing the metallic components present therein to undergo insolubilization and consequent coprecipitation, then dehydrating and drying the resultant coprecipitation product, bringing the solid product as adsorbent into contact with said waste water containing organic pollutants and causing the organic pollutants to be removed from the waste water and adsorbed on the solid.

The solid substance obtained by dehydrating and drying the coprecipitation product resulting from the insolubilization of said metallic elements has an adsorbing capacity for exceeding that of calcium oxide which is used as the adsorbent in the massive lime method and provides efficient adsorption of organic pollutants present in virtually every sort of waste water. Moreover, the adsorbent which has adsorbed said organic pollutants can readily be disposed of because it has a high sedimentation velocity and low water adherence characteristics.

DETAILED DESCRIPTION OF THE INVENTION

As described above, the colored waste waters such as pulping waste water, water containing natural humic substances, dyeing waste water, etc. contain various organic substances which are possible sources for environmental pollution. For tolerable release of these waste waters into rivers and other natural bodies of water, therefore, such organic pollutants must be completely removed therefrom.

The inventors pursued devoted studies in search for a method capable of providing effective treatment for these waste waters containing organic pollutants. They have consequently made a discovery that mixing an aqueous solution containing aluminum with an aqueous solution calcium and/or an aqueous solution containing magnesium and, if necessary, further with an aqueous solution containing iron and adjusting the pH of the resulting mixture to cause the formation of the hydroxides of the metallic components results in insolubilization of the metallic components present therein and consequently gives rise to copreciptation, that the solid substance obtained by dehydrating and drying the coprecipitation product possesses an adsorbing capacity excelling that of calcium oxide which is used in the massive lime method and further that the sludge formed by addition of said dehydrated solid to the waste water shows a high precipitation velocity and permits ready dehydration. The present invention has been accomplished on the basis of this discovery.

To be specific, the present invention comprises mixing an aqueous solution containing aluminum with at least one aqueous solution selected from the group consisting of an aqueous solution containing calcium and an aqueous solution containing magnesium, adjusting the resultant mixture to a pH value of more than 8 for thereby allowing the metallic components present therein to undergo insolubilization and consequent coprecipitation, dehydrating and drying the coprecipitation product and putting the resultant solid substance to use as an adsorbent for the treatment of waste waters containing organic pollutants.

The adsorbent to be used in the present invention is a solid substance which is obtained by dehydrating and drying a gelled product of plural specific metal hydroxides formed by the coprecipitation method, and it can be prepared by a various methods.

In the case of an adsorbent containing aluminum and calcium according to the present invention, for example, it can be prepared by the dropwise introduction of sodium aluminate solution, while under agitation at a temperature in the range of from room temperature to about 70° C, into the aqueous solution of a soluble calcium salt such as chloride or nitrate, adjusting the pH value of the mixture to more than 8 for inducing homogeneous gelation, allowing the resultant gel to age, separating the aged gel and thereafter drying it.

Alternatively, the preparation may be achieved by uniformly mixing the solution of a soluble salt of acidic aluminum such as aluminum chloride with the solution of a soluble salt of calcium, either inducing precipitation of a gel by adjusting the pH value of the resultant mixture to more than 8 by using a pH such as HCl, NaOH, $Na_2CO_3$ or $Ca(OH)_2$ or inducing precipitation of a gel in accordance with the homogeneous precipitation method by using urea, allowing the resultant gelled substance to age, washing this gel with water and drying.

An adsorbent containing magnesium may be prepared by a similar procedure. It is also possible to mix an aqueous solution containing a calcium component and an aqueous solution containing a magnesium component with an aqueous solution containing an aluminum component, adjust the resultant mixture in its pH value and thereafter agitate the mixture to have the three metallic components homogenuously mixed and gelled, continue the agitation to have the gelled product aged, separate the aged gel, dry it and use the dry gel as an adsorbent. In this case, an aqueous solution containing both the calcium and the magnesium components can be used.

An effective adsorbent can also be obtained by mixing an aqueous solution containing iron to the mixture of an aqueous solution containing aluminum with an aqueous solution containing calcium and/or an aqueous solution containing magnesium adjusting the pH of the resulting mixture as described above, agitating the mixture to obtain a gel containing the precipitates, and drying and pulverizing the gel after aging.

The mixing ratios of these metallic components for the composition of adsorbents are desired to be such that, in the case of an aluminum-calcium type adsorbent, the aluminum content falls in the range of from about 30 to about 60% by weight (as $Al_2O_3$) and the calcium content in the range of from about 10 to about 25% by weight (as CaO) and, in the case of an aluminum-magnesium type adsorbent, the aluminum content falls in the range of from about 15 to about 30% by weight (as $Al_2O_3$) and the magnesium content in the range of from about 20 to about 40% by weight (as MgO). Where an iron component is incorporated into such an adsorbent, the amount thereof is desired not to exceed the level of 15%. Use of metallic components in amounts falling outside their respective ranges proves disadvantageous because it results in deficient adsorbing capacity or poor economy.

Mixture of these metallic components must be effected by a specific procedure which comprises mixing aqueous solutions containing required metallic components, adjusting the pH value of the resultant mixed solution and thereby allowing these metallic components to be gelled and coprecipitated and aging the formed coprecipitation product. When a solid substance is obtained by merely mixing hydroxides containing said metallic components or by adding a calcium component and/or a magnesium component in a solid phase to a solution containing an aluminum component, then adjusting the pH value of the resultant mixture, allowing the solids in the mixture to be precipitated in a suitable solvent and finally drying the precipitate, this solid substance adsorbs almost no organic pollutants when it is brought into contact with a waste water containing said organic pollutants.

In the preparation of the adsorbent according to the present invention, a solid substance such as silicic acid, a silicate, furnace droth or red mud may be added as a reinforcing material to the coprecipitated gelled substance at the end of aging thereof, for the purpose of imparting enhanced strength thereto. The solid substance obtained in this manner is dried by heating to about 110° C, pulverized to a suitable particle diameter and put to use effectively as the adsorbent. This solid substance may be used in the form of granules obtainable by means of spray drying. The adsorbing ability of any of the adsorbents can be activated further by additional calcination at temperatures in the range of from 400° to 800° C.

The treatment of the waste water according to the present invention can be carried out by various methods such as a method resorting to addition of the adsorbent in the form of a powder or a method utilizing the principle of fluidization. Such methods may be adopted either batchwise or in a continuous operation. To carry out the treatment of waste water by the method involving the use of a powdery adsorbent, for example, the adsorbent in a powdered form is directly added to the waste water to have the pollutants adsorbed thereon, with the resultant sludge separated by precipitation or floatation. In this case, it is permissible to use, in conjunction with said adsorbent, an inorganic or organic coagulant as occasion demands. Then, the slurry consequently formed is dehydrated by a known method and the solid resulting from said dehydration is recovered. The solid substance thus obtained is discarded as by being deposited in the earth. Otherwise, it may be heated to about 550° C to have the adsorbed organic pollutants incinerated, so that what is left thereafter may be used again as the adsorbent. For the treatment of the waste water by the column process, the aforementioned adsorbent in the form of a powder or granules is treated and pelletized to a suitable particle diameter, the resultant granular adsorbent is placed in a column and the waste water is allowed to flow through the interior of the column. After the adsorption capacity has been exhausted due to saturation, the adsorbent is withdrawn from the column and then discarded as described above or subjected to regeneration for the purpose of cyclic use. To have the waste water treated by the fluidization process, a column is packed with the adsorbent in the form of a powder or granules and the waste water is introduced through the bottom of this column to flow up to the interior of the column so that the upward flow of the waste water causes the individual adsorbent particles to float out of position and form a fluidized bed. In this case, the fluidized adsorbent particles are continuously drawn out of the column portionwise to be regenerated in a separate device and the regenerated adsorbent particles are replaced in the column. This procedure permits cyclic use of the adsorbent.

Differently from conventional adsorbents, the adsorbent of the present invention does not form flock or colloid upon the adsorption of organic pollutants but instead forms sludge. Consequently, it excels in sedimentation velocity and has low water adherence characteristics and, when used in accordance with the method for addition of powdered adsorbent, reduces treatment time and lends itself to easy separation and recovery. When the adsorbent of the present invention is packed in a column through which waste water is passed for treatment, the flow of waste water through the column proceeds rapidly making it possible to treat a large amount of waste water quickly and easily.

The amount of adsorbent added to the waste water to be treated need only be at least equivalent to the amount of organic pollutants to be removed. That is, 1000 ppm or more of adsorbent is sufficient to treat waste water having 1000 ppm of organic pollutants.

For the practice of the method of the present invention, it is essential to use, as the adsorbent, the product to be obtained through the coprecipitation effected in the aqueous solution as described above. When this treatment is attempted by use of independent hydroxides of the component elements or of a mere mixture thereof, the effect of treatment is too inferior to accomplish the desired result.

The adsorbent to be used in the present invention provides not merely Coulombic adsorption but also the form of adsorption which involves the mechanism of chelate formation. The adsorbent is further macroporous and has an extremely large specific surface area of about 200 m$^2$/g which gives it adsorbing capability on a level with activated carbon and causes it to form sludge. The adsorbent can therefore be applied to various kinds of pulping waste water such as kraft pulping waste, sulfite pulping waste and NSSCP (neutral sulfite semichemical pulping) waste without any preference. The lignosulfonates present in the pulping waste water vary in kind with the particular process of digestion involved, namely the kind of the pulping waste water itself. Although the massive lime method has been recognized as optimally suitable for the treatment of pulping waste water, the efficiency of treatment by this method is heavily affected by the kind of pulping waste water. It is satisfactorily effective only in the treatment of kraft pulping waste and does not manifest any appreciably high treating efficiency on the sulfite pulping waste and the NSSCP waste. Particularly in the case of the NSSCP waste of which the treatment for detoxification is the most difficult to accomplish, the massive lime method barely manages to show 40% of color removal and about 50% of removal of lignosulfonates at most. The method according to the present invention exhibits a treating ability excelling that of the massive lime method on all kinds of pulping waste water including the NSSCP waste, the sulfite pulping waste and the kraft pulping waste. In the case of the NSSCP waste, for example, the method of this invention shows 80 to 99% of color removal and 75 to 85% of removal of lignosulfonates.

The adsorbent according to the present invention is composed of metallic components which are harmless to the human system. This means that it has no possibility of causing any environmental pollution even if it should escape from the system in which the adsorbent is under production or it is brought into contact with a given waste water for treatment. When the adsorbent comes into contact with the waste water and adsorbs organic pollutants present therein, it assumes the form of sludge and thus excels in sedimentation velocity and low water adherence characteristics so that the sludge can easily be separated from the waste water. The adsorbent which has adsorbed organic pollutants may be subjected to the treatment for disposal in its unaltered form. Otherwise, it may be burnt so as to be used again, proving to be of great economy.

Now, the present invention will be described herein below with reference to preferred embodiments, Examples 1 through 8 which are illustrative of the method for manufacture of adsorbents and to preferred embodiments, Examples 9 through 16 which are illustrative of the method for treatment of waste water by use of such adsorbents. The present invention is not limited to these examples. In these examples, the ratio of color removal reported was calculated from decreases in absorption coefficient of visible light having a wavelength of 457 nm and the ratio of removal of lignosulfonates from decreases in adsorption coefficient of light having a wavelength of 280 nm. The ratio of COD removal reported was determined by a method which comprises adding to a test specimen prescribed amounts of potassium perchromate solution and sulfuric acid, boiling and refluxing the resultant mixture and titrating excess perchromic acid with an ammonium ferrous sulfate solution (hereinafter referred to as "potassium perchromate method") or a method which comprises mixing a given test specimen and a prescribed excess amount of potassium permanganate to each other, heating the resultant mixture at 100° C for a fixed length of time to effect reaction thereof, and thereafter measuring the amount of potassium permangante spend in said reaction (hereinafter referred to briefly as "permanganic acid method"). Further, TOC removal was measured by using a 102-A type measuring apparatus produced by Toshiba-Beckman Co., Ltd.

EXAMPLE 1

With water, 52.7g of sodium aluminate (containing 10.2g as $Al_2O_3$) was dissolved and diluted to a total volume of 200ml. This solution was introduced dropwise with simultaneous agitation into 200 ml of a solution containing 22g of calcium chloride ($CaCl_2.6H_2O$) at room temperature over a period of 30 minutes and, at the end of the dropwise introduction, the resultant mixture was adjusted to pH 11.5 by addition of dilute hydrochloric acid, with the result that there occurred a white gel-like precipitate. This precipitate was agitated for one hour for the purpose of aging. It was then removed of secondary products by washing with 10 liters of water. Then, the gelled substance was separated by filtration and the cake thus obtained was dried at about 110° C within an oven. The product was pulverized. There was consequently obtained 18.6g of a powdered adsorbent containing 44.9% of aluminum as $Al_2O_3$ and 18.6% of calcium as CaO.

EXAMPLE 2

With water, 17.7g of calcium chloride ($CaCl_2.6H_2O$) was dissolved and diluted to a total volume of 400 ml. Into this solution, a solution obtained by dissolving 23.2g of sodium aluminate (containing 4.5g as $Al_2O_3$) in 300 ml of water was introduced dropwise with simultaneous agitation at room temperature over a period of 30 minutes. Then, the resultant reaction solution containing a white gel was heated to 70° C and, thereafter, 300 ml of a solution containing 3.5g of ferric chloride hydrate ($FeCl_3.6H_2O$) was introduced dropwise therein over a period of 30 minutes. The resultant mixture was adjusted to pH 11.0 by addition of dilute hydrochloric acid and was then agitated for one hour for the purpose of aging. By washing with water, drying and pulverizing the resultant gelled substance by following the procedure of Example 1, there was obtained 11.4g of a powdery adsorbent (containing 23.9% of calcium as CaO, 33.8% of aluminum as $Al_2O_3$ and 7.3% of iron as $Fe_2O_3$).

EXAMPLE 3

Into 1,000 ml of water, 500 ml of an aqueous solution containing 121.8g of magnesium chloride ($MgCl_2.6H_2O$) and an aqueous solution containing 52.7g of sodium aluminate (containing 10.2g as $Al_2O_3$), 14.4g of sodium hydroxide and 27g of sodium carbonate were introduced dropwise with simultaneous agitation at room temperature over a period of 30 minutes. The pH of the reaction mixture was about 10. The resultant reaction mixture containing a white gel-like precipitate was agitated for 30 minutes for the purpose of aging of the said gelled substance. By washing with water, drying and pulverizing the resultant gelled substance by following the procedure of Example 1, there was obtained 58.8g of a powdered adsorbent (containing 16.8% of aluminum as $Al_2O_3$ and 37.5% of magnesium as MgO).

EXAMPLE 4

500 ml of an aqueous solution containing 81.2g of magnesium chloride ($MgCl_2.6H_2O$) and 500 ml of an aqueous solution containing 52.7g of sodium aluminate, 12g of sodium hydroxide and 13.8g of sodium carbonate were mixed by stirring and, at the same time, introduced dropwise into 1,000 ml of water at room temperature over a period of 30 minutes. The pH of the reaction mixture was about 10. After completion of the dropwise introduction, the mixture containing a white gel-like precipitate produced therein in consequence of reaction was given a continued agitation for the purpose of aging of the gel. At the end of the aging, by washing with water, drying and pulverizing the gelled substance by following the procedure of Example 1, there was obtained 47.9g of a powdered adsorbent (containing 22.2% of aluminum as $Al_2O_3$ and 32.1% of magnesium as MgO).

EXAMPLE 5

300 ml of an aqueous solution containing 22.5g of sodium aluminate (containing 5g as $Al_2O_3$) was introduced dropwise with simultaneous agitation into 300 ml of an aqueous solution containing 11.8g of calcium chloride ($CaCl_2.6H_2O$) at room temperature over a period of 30 minutes. The resultant reaction solution containing a white gel was heated to 50° C and thereafter 200 ml of an aqueous solution containing 22.5g of sodium silicate (containing 2g as $SiO_2$) was introduced dropwise therein. Subsequently, the solution was adjusted to pH 11.0 by addition of dilute hydrochloric acid and then agitated for one hour in order for the formed gel-like precipitate to age. At the end of the aging, by washing with water, drying and pulverizing the precipitate, there was obtained 14.4g of a powdered adsorbent (containing 18.5% of calcium as CaO, 32.5% of aluminum as $Al_2O_3$ and 14.4% of silica as $SiO_2$).

EXAMPLE 6

Into 600 ml of water, 700 ml of an aqueous solution containing 143.0g of magnesium chloride ($MgCl_2.6H_2O$), and 700 ml of an aqueous solution containing 322.0g of sodium aluminate (containing 61.0g as $Al_2O_3$) and 12g of sodium hydroxide were introduced dropwise with simultaneous agitation at about 75° C. The pH of the reaction mixture was about 10. The reaction solution was left to stand in order for the gel-like precipitate formed consequently therein to age. Thereafter, by washing with water, drying and pulverizing the precipitate, there was obtained a powdered adsorbent (containing 26.6% of aluminum as $Al_2O_3$ and 24.2% of magnesium as MgO).

EXAMPLE 7

In 300 ml of an aqueous solution containing 22.0g of calcium chloride ($CaCl_2.6H_2O$), 20.0g of red mud as suspended. While this solution was kept under vigorous agitation, 200 ml of an aqueous solution containing 52.7g of sodium aluminate (containing 10.2g as $Al_2O_3$) was introduced therein. The gel-like precipitate which consequently occured in the reaction solution was washed with water, dried and pulverized and further calcined at 500° C for 30 minutes. Consequently, there was obtained a powdered adsorbent.

EXAMPLE 8

An adsorbent was obtained by thoroughly mixing 10.0g of the powdered adsorbent prepared in Example 1 with 10.0g of red mud and thereafter calcined the resultant mixture at about 500° C for 30 minutes.

EXAMPLE 9

To 10-ml test specimens (having 1.15% of organic substance as solids) of an approximately 1% solution of NSSCP waste, removed in advance of inorganic solids by use of a cation-exchange resin, the adsorbents prepared in Examples 1 through 4 and calcium oxide (treated by the massive lime method) as a control were separately added in the amounts indicated in Table 1. The test specimens thus containing the adsorbents where shaken for one hour and then subjected to centrifugal separation to remove the adsorbents. The filtrates were tested for ratios of decrease in color, lignosulfonates and COD. The results were as shown in Table 1. At the end of the treatment for adsorption, the adsorbents which had been used in the adsorbing treatment described above (those of the test runs involving a specimen weight of 1g only) were regenerated by being burnt at about 550° C for one hour so as to liberate the adsorbate by incineration. The regenerated adsorbents were similarly subjected to treatment of 10-ml test specimens of the same NSSCP waste by the same procedure. The results obtained are also shown in Table 1.

Table 1

| Subject of test Amount added Adsorbents | Color Removal (%) | | | | Removal of lignosulfonates (%) | | | | COD (%) (Potassium perchromate method) | | | |
| --- | --- | --- | --- | --- | --- | --- | --- | --- | --- | --- | --- | --- |
| | 1g | 1.5g | 1.8g | 2.0g | 1g | 1.5g | 1.8g | 2.0g | 1g | 1.5g | 1.8g | 2.0g |
| Example 1 | 54.5 | 73.6 | 75.6 | 80.5 | 63.9 | 70.8 | 72.4 | 76.9 | 48.4 | 53.3 | 56.9 | 61.6 |
| Example 2 | 62.5 | 75.1 | 88.4 | 92.5 | 68.1 | 75.0 | 79.2 | 81.4 | 52.9 | 56.2 | 65.9 | — |
| Example 3 | 92.9 | 93.2 | 95.1 | 94.4 | 77.7 | 81.7 | 83.8 | 84.6 | 50.3 | 54.2 | 64.7 | 66.3 |
| Example 4 | 97.5 | 95.1 | — | 99.9 | 76.5 | 80.4 | 82.8 | 83.8 | 57.2 | 61.1 | — | 69.1 |
| CaO (Regenerated adsorbents) | 31.2 | 31.7 | — | 35.8 | 49.5 | 50.1 | — | 52.4 | 47.0 | 49.0 | — | 51.0 |

Table 1-continued

| Subject of test Amount added Adsorbents | Color Removal (%) | | | | Removal of lignosulfonates (%) | | | | COD (%) (Potassium perchromate method) | | | |
|---|---|---|---|---|---|---|---|---|---|---|---|---|
| | 1g | 1.5g | 1.8g | 2.0g | 1g | 1.5g | 1.8g | 2.0g | 1g | 1.5g | 1.8g | 2.0g |
| Example 1 | >90 | | | | 90.1 | | | | | | | |
| Example 2 | >90 | | | | 94.0 | | | | | | | |
| Example 3 | 82 | | | | 84.8 | | | | | | | |
| Example 4 | 64.6 | | | | 80.7 | | | | | | | |

From Table 1, it is seen that in the treatment of NSSCP waste water, the adsorbents according to the present invention by far exceed those of the conventional massive lime method in terms of the removal of color lignosulfonates and that the aluminum-calcium type adsorbents are notably improved in the adsorbing activity when they are subjected to a heat treatment at temperature over 500° C.

EXAMPLE 10

To two 10-ml test specimens (having 0.98% of solids content of an approximately 1% solution of kraft pulping waste removed in advance of inorganic substances by the acid precipitation method, 1g of the adsorbent obtained in Example 2 and 1g of calcium oxide (treated by the massive lime method) as a control were separately added. The test specimens containing the adsorbents were shaken for 1 hour and then subjected to centrifugal separation to obtain their respective supernatents. The filtrates were tested for removal ratios of color, lignosulfonates and COD. The results shown in Table 2.

Table 2

| | Subject of Test | | |
|---|---|---|---|
| Adsorbent | Color Removal (%) | Removal of lignosulfonates (%) | COD (%) (Potassium perchromate method) |
| Example 2 | 99.6 | 99.2 | 97.2 |
| CaO | 99.3 | 99.2 | 96.4 |

EXAMPLE 11

On lignosulfonic acid solutions obtained from the wastes of acidic sulfite pulps using softwood and hardwood, treatment by use of the adsorbents according to the present invention and control treatment according to the massive lime method (calcium oxide) were carried out. In the case of the lignosulfonic acid from the softwood pulp, said treatment was effected by adding 1g of the adsorbent of Example 5 to 10 mg of a 1.09% aqueous solution (in a decalcined form) of the acid, followed by one hour's shaking of the mixture. And in the case of the lignosulfonic acid from harwood pulp, the treatment was performed by adding 1g of the adsorbent of Example 1 to 10 ml of a 1.14% aqueous solution (in a decalcined form) of the acid and subsequently shaking the mixture for one hour. The treatment by the massive lime method was carried out by adding 1g of calcium oxide to each of the aqueous lignosulfonic acid solutions and shaking the resultant mixtures for one hour. At the end of the treatment, the solutions were subjected to centrifugal separation. The resultant filtrates were tested for ratios of removal of color, lignosulfonates and COD. The results are shown in Table 3.

Table 3

| | | Subject of Test | | | |
|---|---|---|---|---|---|
| | | Color Removal (%) | | Removal of lignosulfo- | COD (%) (Potassium perchromate |
| Waste | Adsorbent | pH unadjusted | Neutralized | nates (%) | method) |
| Soft-wood | Ex. 5 | 79.3 | 94.7 | 91.6 | 94.3 |
| | CaO | Darker than untreated waste | 43.4 | 52.0 | 47.7 |
| Hard-wood | Ex. 1 | 89.1 | 94.8 | 91.7 | 89.8 |
| | CaO | 71.6 | 84.1 | 76.9 | 76.0 |

It is clear from Table 3 that the adsorbents according to the present invention produce excellent effects on all kinds of pulping waste water without reference to the particular kind of pulp source, while those by the massive lime method are not very effective on the acid SP waste water if the pulp involved happens to originate from softwood.

EXAMPLE 12

To 10-ml test specimens of the L-KP waste water (having 1.02% of organic solids content), L-NSSCP waste water (having 1.00% of solids contents) and Mg based bisulfates waste water (having 0.99% of solids content), the adsorbent prepared by the procedure of Example 6 was added in the amounts indicated in Table 4. The test aspecimens containing the adsorbent were shaken for one hour. The supernatants formed thereon were tested for removal ratios of color and lignosulfonates. The results were as shown in Table 4, in which the results obtained likewise with adsorbents by the massive lime method are shown for comparison.

Table 4

| Waste Water | L-KP | | L-NSSCP | | Mg-Bisulfite | |
|---|---|---|---|---|---|---|
| Amount added | 1.0g | | 1.0g | | 0.5g | |
| Subject of Test Adsorbents | Color Removal (%) | Removal of lignosulfonates (%) | Color Removal (%) | Removal of lignosulfonates (%) | Color Removal (%) | Removal of lignosulfonates (%) |
| Example 6 | 99.8 | 94.3 | 99.9 | 95.8 | 100 | 87.0 |
| CaO | 94.9 | 85.6 | 40.4 | 45.5 | Darker Than untreated waste | 53.0 |

EXAMPLE 13

To 50 ml of an alkali-extracted waste water of KP bleaching stage (containing 790 ppm of solids), 400 mg of the adsorbent obtained by the procedure of Example 5 was added. The mixture was shaken for one hour and filtered. The filtrate was tested for removal ratio of color. The result was 91.3%. In a control test performed by using the adsorbent prepared by the massive lime method, the removal ratio of color was measured to be 89.4%.

EXAMPLE 14

To 10-ml test specimens of a lauan wood NSSCP waste water (having 1.00% solids content) which had been decalcined and treated with ethanol for removal of hemicellulose in advance, the adsorbent prepared by the reference of Example 8 was added in different amounts of 1.0g, 1.2g, 1.5g and 2.0g. Each resultant mixture was shaken for one hour and then filtered. The filtrate was measured for removal ratios of color, lignosulfonates and COD. The results are shown in Table 5, in which the results obtained likewise with adsorbents by the massive lime method are shown for comparison.

Table 5

| | Subject of Test | | | | | | | | | | | |
|---|---|---|---|---|---|---|---|---|---|---|---|---|
| | Removal of lignosulfonates (%) | | | | Color Removal (%) | | | | COD (%) | | | |
| Amount added Adsorbents | 1g | 1.2g | 1.5g | 2g | 1g | 1.2g | 1.5g | 2g | 1g | 1.2g | 1.5g | 2g |
| Example 8 | 82.8 | 87.8 | 89.5 | 94.5 | 93.4 | 97.1 | 97.3 | 97.6 | 63.6 | 71.2 | 73.3 | 80.0 |
| CaO | 77.7 | 79.0 | 78.5 | 76.0 | 87.6 | 89.5 | 89.8 | 86.8 | 26.8 | 43.5 | 43.0 | 43.6 |

EXAMPLE 15

To 10-ml test specimens of the Mg based bisulfite waste water which had been decalcined and treated with acetone in advance (containing 1.12% of solids), the adsorbents prepared by the procedures of Examples 1, 2 and 3 were added separately each in the amount of 1g. Each resultant mixture was shaken for one hour and then filtered. The filtrate was tested for color, lignosulfonates, COD and TOC. The adsorbents remaining after the separation of said filtrates adsorption of organic pollutants thereon were subjected to a heat treatment for one hour; those from Examples 1 and 2 at about 750° C and that from Example 3 at about 650° C, respectively, to be removed of organic pollutants by incineration. The solids resulting from the incineration were again tested for the treatment of the same waste water under the same conditions. The adsorbents were thus used in a total of five cycles. The results are shown in Table 6.

Table 6

| Subject of Test | Removal of lignosulfonates (%) | | | | | | Color Removal (%) | | | | | |
|---|---|---|---|---|---|---|---|---|---|---|---|---|
| Cycle Adsorbents | 0 | 1 | 2 | 3 | 4 | 5 | 0 | 1 | 2 | 3 | 4 | 5 |
| Example 1 | 73.5 | 87.0 | 88.5 | 82.8 | 87.5 | 79.3 | 68.1 | 89.7 | 97.3 | 97.9 | 99.0 | 98.3 |
| " 2 | 67.0 | 87.3 | 91.5 | 85.8 | 91.8 | 83.8 | 72.4 | 97.5 | 95.5 | 93.8 | 97.7 | 97.7 |
| " 3 | 77.3 | 99.5 | 97.3 | 72.5 | 94.8 | 83.8 | 87.4 | 99.2 | 98.1 | 98.4 | 99.6 | 98.8 |

| Subject of Test | COD (%) | | | | | | TOC (%) | | | | | |
|---|---|---|---|---|---|---|---|---|---|---|---|---|
| Cycle Adsorbents | 0 | 1 | 2 | 3 | 4 | 5 | 0 | 1 | 2 | 3 | 4 | 5 |
| Example 1 | 59.1 | 78.6 | 83.5 | 71.8 | 82.3 | — | 35.8 | 88.0 | 78.5 | 73.8 | 79.7 | 88.0 |
| " 2 | 55.1 | 71.5 | 90.7 | 77.6 | 94.1 | — | 52.2 | 80.2 | 86.8 | 79.1 | 86.3 | 74.3 |
| " 3 | 65.7 | 75.1 | 65.7 | 60.4 | 75.0 | — | 59.1 | 83.8 | 59.1 | 54.2 | 71.0 | 50.0 |

It is clear from Table 6 that the adsorbents thus tested showed virtually the same adsorbing capacity throughout the total of five cycles of use.

EXAMPLE 16

0.25g of a basic dye (malachite green) and 2.5g of anhydrous sodium sulfate were dissolved in 1 l of water. To 20-ml aliquots of the resultant solution, the adsorbents prepared by the procedures of Examples 2, 5 and 8 were respectively added each in an amount of 20mg. Each resultant mixture was shaken for one hour and thereafter subjected to centrifugal separation to remove the adsorbent. The filtrate thus obtained was adjusted to pH with an aqueous 10% $CH_3COOH$ solution and tested for color removal ratio through measurement of absorption coefficient at 610 nm. The results are shown in Table 7.

Table 7

| Adsorbents | Example 2 | Example 5 | Example 8 |
|---|---|---|---|
| Color Removal (%) | 97.5 | 97.5 | 90.6 |

What is claimed is:

1. A process for removing colored soluble organic pollutants from waste water which comprises mixing with said waste water a solid product prepared by the process which comprises mixing an aqueous aluminum solution with an aqueous solution of a calcium or magnesium, adjusting the pH of the resulting mixture to a value greater than 8, whereby the metallic components react with each other and a gel precititates; separating the precipitated gel from the reaction mixture and then drying the gel; the mixing ratio of said aqueous solutions being chosen such that when said aqueous calcium solution is mixed with said aqueous aluminum solution, the aluminum content of the gel calculated as $Al_2O_3$, is in the range of from about 30 to 60% by wt. and the calcium content of the gel, calculated as CaO, is in the range of from about 10 to 25% by wt., and when said aqueous magnesium solution is mixed with said aqueous aluminum solution, the aluminum content of the gel, calculated as $Al_2O_3$, is in the range of from about 15 to 30% wt.% and the magnesium content of the gel, calculated as MgO, is in the range of from about 20 to 40 wt.%.

2. The method of claim 1, wherein sodium aluminate is used as the aluminum containing solution.

3. The method of claim 1, wherein calcium chloride is used as the calcium containing solution.

4. The mthod of claim 1, wherein magnesium chloride is used as the magnesium containing solution.

5. The method of claim 1, wherein the dehydrated solid which has been brought into contact with the waste water containing organic pollutants is separated from said waste water and subjected to a heat treatment and the resultant incinerated solid is brought again into contact with the same waste water containing organic pollutants.

6. The method of claim 1, further comprising adding an aqueous solution containing an iron component to the aqueous solution containing aluminum.

* * * * *